Dec. 24, 1946.     B. WHEELWRIGHT     2,413,272
TILTING CAMERA
Filed June 19, 1944     2 Sheets-Sheet 1
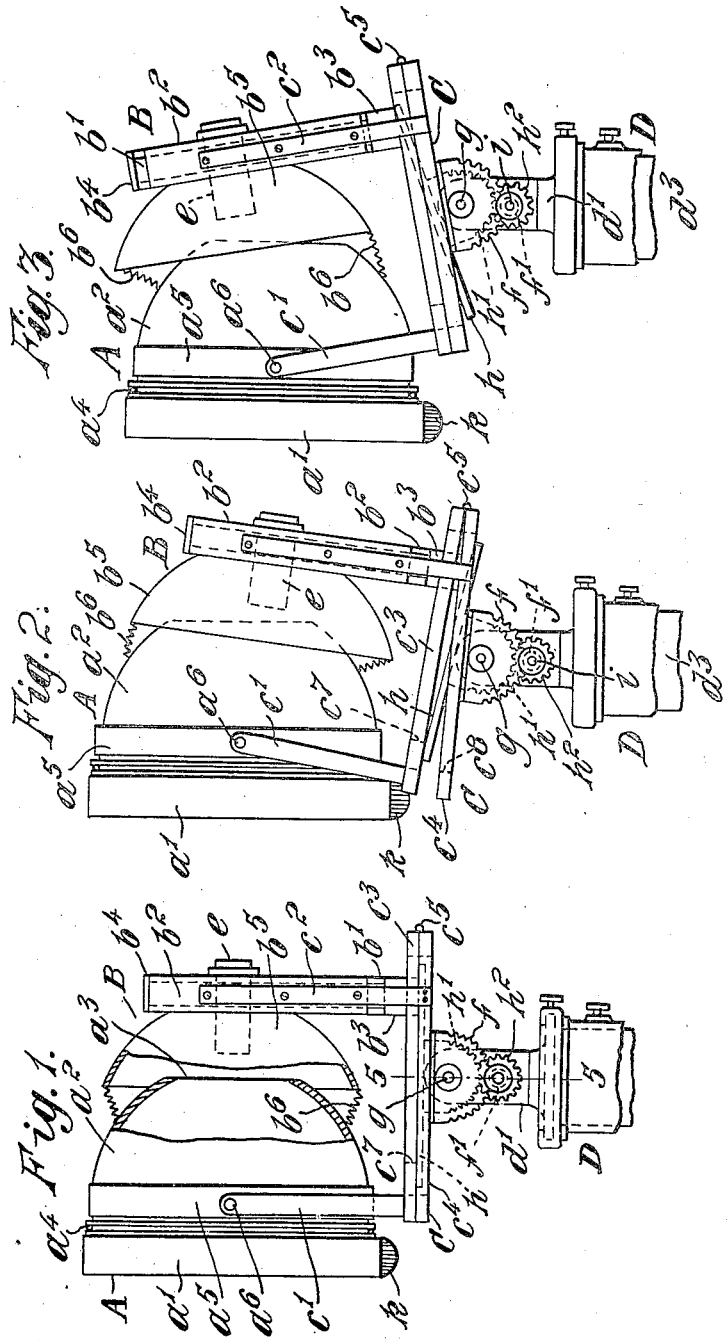

Dec. 24, 1946.  B. WHEELWRIGHT  2,413,272
TILTING CAMERA
Filed June 19, 1944  2 Sheets-Sheet 2
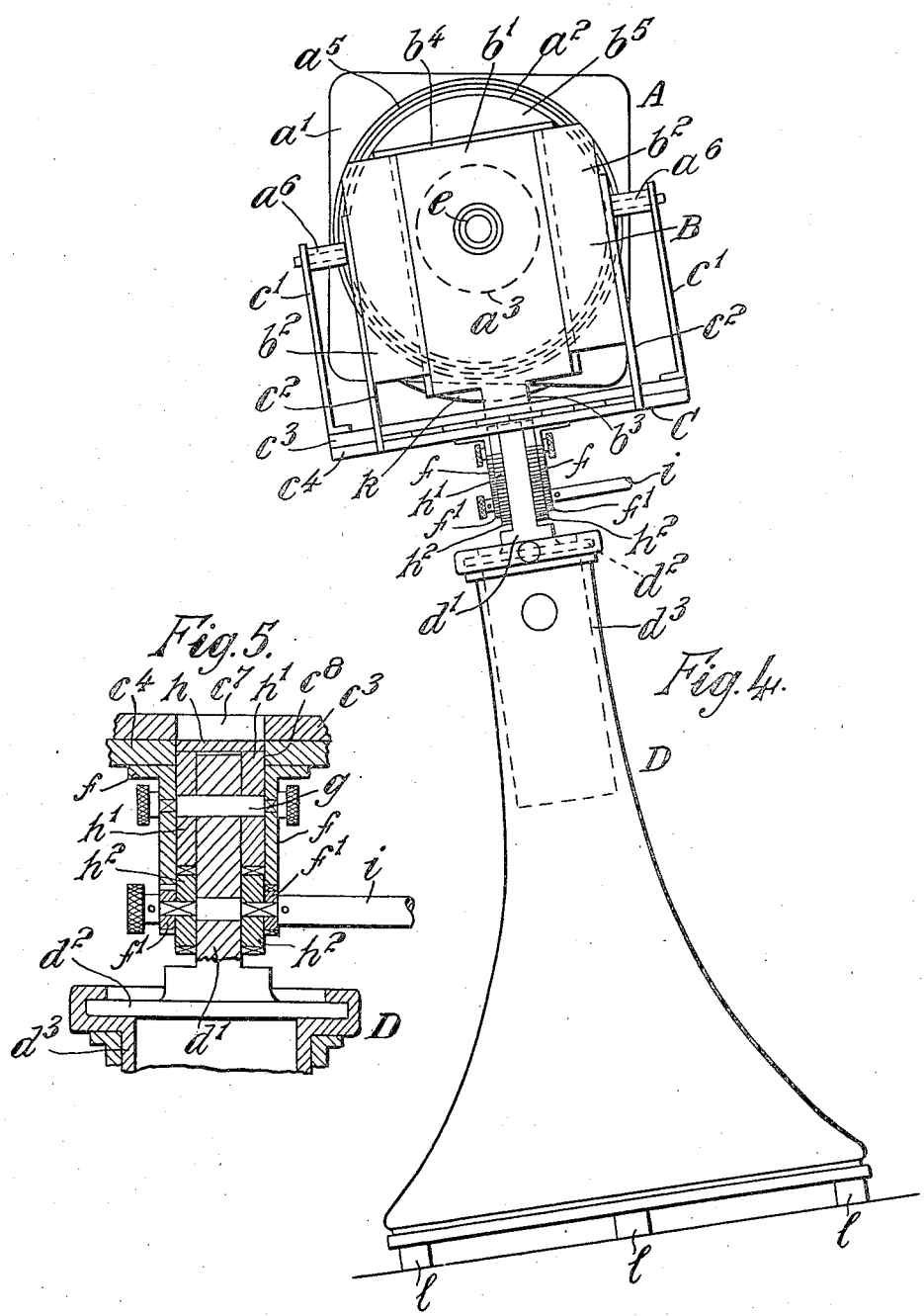

Patented Dec. 24, 1946

2,413,272

UNITED STATES PATENT OFFICE 2,413,272

TILTING CAMERA

Bernard Wheelwright, West Smethwick, England

Application June 19, 1944, Serial No. 541,055
In Great Britain September 22, 1943

11 Claims. (Cl. 95—50)

My invention relates to photographic apparatus and more particularly is concerned with apparatus designed for taking "oblique" photographs from aeroplanes, but which may also be used with advantage for taking photographs from fixed high altitudes, as for example church towers, and for taking photographs of high buildings from ground level.

As is well understood photographs taken from high altitudes and photographs from ground level of high buildings have certain defects or distortions technically termed "tilt" and "side rocking," these distortions being due to the fact that the camera is always more or less tilted from a level or horizontal plane at the moment of exposure.

My invention has for its object to provide photographic apparatus whereby oblique photographs can be taken which are practically free from the defects or distortions aforesaid.

Broadly my invention resides in photographic apparatus for the purpose specified characterised in that the camera embodies a focal plane or negative holder section, hereinafter for brevity referred to as the body proper, so mounted that the plane of the sensitive or other surface on which the image is received is automatically maintained in a vertical plane irrespective of the angle which any other parts of the apparatus or the aeroplane, where the apparatus is employed for taking photogrammetric aerial photographs may hold or assume at the moment of exposure, and wherein the lens, or lens system, associated with the said body proper is so mounted relative thereto, that the optical axis can be deflected in a vertical plane, to any desired angle to the normal to the plane of the sensitive or other surface whereon the image is received, the section carrying the lens, or lens system, being so interconnected with the body proper that when the optical axis is set to any desired angle of depression or elevation the body proper or the lens carrying section is simultaneously and automatically moved to a position which maintains the centre or principal point of the photograph coincident, or practically coincident, with the foot of the optical axis.

A convenient embodiment of my invention as applied to a stand supported camera such as may be designed for use on an aeroplane or a cinematograph is represented, more or less diagrammatically, in the accompanying drawings with reference to which the invention will be further and more particularly described.

Figure 1 represents the apparatus partly in elevation and partly in section the upper portion only of the stand being shown in the said figure and the parts being in the positions which they occupy when the camera base is horizontal and in which condition the optical axis of the lens, or lens system, is normal to the vertical plane occupied by the sensitive or other surface whereon the image is received.

Figure 2 is a similar view to Figure 1 showing the parts of the apparatus in positions which they may occupy or assume relative to each other when the optical axis of the lens, or lens system, is deflected downwardly for directing the same towards a target or landscape when taking photographs from high altitudes.

Figure 3 is a similar view to Figures 1 and 2 showing the parts in positions which they may occupy or assume when the optical axis of the lens, or lens system, is given such degree of elevation as may be requisite or desirable for photographing a high building from ground level or for focussing a target or object which is at a height above the camera level.

Figure 4 is a front elevation of the apparatus showing the parts in the positions which they occupy or assume if and when the base or standard becomes tilted or inclined in a plane transverse to the longitudinal vertical plane containing the optical axis of the lens, or lens system.

Figure 5 is a fragmentary view, partly in elevation and partly in section, on the plane indicated by the dotted line 5—5 Figure 1 and drawn to a larger scale than the other figures of the drawings.

In the embodiment of my invention illustrated in the drawings A denotes generally the body proper of the camera and B the section wherein the lens, or lens system, is mounted, the said sections A and B being supported in a rockable or cradle-like structure, denoted generally by the reference C, and embodying a base which is provided at each side thereof with two upwardly extending arms or bars $c^1$ and $c^2$ to which the sections A and B are respectively attached, the said base being adapted to be mounted, intermediate its rearwardly and forwardly presented ends, on a stand such as D whereon it can be rotated about a vertical axis for the purpose of orientation of the camera, and about a horizontal axis for effecting the variable adjustment of angles of declination, or elevation, which may be required for directing the lens, or lens system, towards the target or subject to be photographed.

The base of the cradle-like structure comprises parts adapted for an angular relative displacement, such as the two superposed boards denoted by the references $c^3$ and $c^4$ which are hinged together at their forwardly presented edges, the hinge being denoted by the reference $c^5$, so that the upper board $c^3$ can perform an angular motion relative to the lower board $c^4$ for the purpose hereinafter more particularly referred to.

The body proper or section A comprises a part $a^1$ which is adapted for the reception of roll films, flat or cut films or glass plates, as may be desired, and a part $a^2$ of a partial hemispherical or dome-like formation disposed concentrically relative to the centre of the focal plane and the forwardly presented end of which has a central aperture $a^3$ therein.

The hollow hemispherical or dome-like part $a^2$ has a light excluding connection with the section $a^1$ and the said part $a^1$ is adapted to rotate freely relative to the part $a^2$ by the provision of a ball bearing race $a^4$ between the presented marginal parts of these sections, or by other anti-frictional bearing means.

The body proper or section A is so mounted between the upper ends of the rearwardly disposed bar members $c^1$ of the cradle structure, which bar members are attached to the upper board $c^3$ of the base, as to be capable of a swivelling motion between the said arms, as for example by the provision on a ring $a^5$ surrounding the dome $a^2$, of diametrically opposite trunnions $a^6$ having a pivotal connection with the said bar members.

The section A maintains a vertical position under the action of a weight denoted by the reference $k$ in the drawings.

The barrel or casing $e$ of the lens, or lens system, is mounted in a bearing or aperture provided for its reception in the middle section $b^1$ of a panel-like member the side portions $b^2$ of which are respectively fixed to the aforementioned bars $c^2$ on the upper board of the base section C, the said middle section of the panel being adapted, by a tongued and grooved or like engagement of its vertical edges with the side sections $b^2$, for a guided vertical sliding motion relative to the base section, its lower end having thereon a part $b^3$ of reduced width which depends into a longitudinally extending slot $c^7$ provided in the upper board $c^3$ and comes under the action of means, working in and through a slot $c^8$ in the lower board, whereby the middle slidable section $b^1$ may be raised relative to the base as for the purpose hereinafter described.

The slidable section $b^1$ takes its normal position, in which position the optical axis of the lens, or lens system $e$, is in alignment with the axis of the part $a^1$ of the body proper, either by gravity, or if desired, under the action of a coiled tension spring or springs (not shown) the respective ends of which would be anchored to the said section and to the base board $c^3$ its movement below the normal position being prevented, as for example by the provision of a bar $b^4$ on its upper end, the respective ends of the said bar taking an abutment on the adjoining corners of the fixed sections $b^2$ of the panel.

Attached to the rearwardly presented face of the slidable section $b^1$ is a hollow and more or less hemi-spherical or dome-like part $b^5$ in the axis of which the barrel or casing of the lens, or lens system $e$, is concentrically disposed, and the rearwardly presented side or edge of the said dome-like part is connected by a light excluding expansible or bellows-like connection with the dome-like part $a^2$ aforesaid of the section A, the said bellows-like connection being indicated in section only by the zig-zag lines marked $b^6$ in Figures 1, 2 and 3.

The base of the cradle-like structure may be adapted for mounting on the stand D in a manner which will permit movements of the cradle structure for the purpose of orientating the camera and for adjusting the optical axis to varying angles of declination as illustrated for example by Figure 2, or of elevation as shown for example in Figure 3, by the provision on the underside of the lower board $c^4$ of a pair of depending brackets $f$ of an L or angle formation, the horizontal parts of the brackets serving for their attachment to the base section.

The said brackets are disposed one at each side of the longitudinally extending slot $c^8$ in the lower board $c^4$ of the cradle base their vertical inner faces being preferably flush with the edges of the said slot and they are fixed on and adapted to turn with a spindle $g$ extending between them and whereby the cradle base is pivotally connected with a flattened or plate-like part on an upwardly projecting post $d^1$ provided and axially disposed on the top face of a disc $d^2$ mounted at the upper end of a tubular member or rod $d^3$ which fits and can be rotated through any desired angle in the stand D for the purpose of orientation, means such as locking pads being provided for avoiding inadvertent movement of the parts when the desired orientation is effected.

The means for effecting the rocking of the section C or cradle-like structure for the purpose of giving any requisite or desired angle of depression or elevation to the optical axis of the lens, or lens system, when directing or setting the same on a target or landscape and for simultaneously and automatically effecting such movement of the section A relative to the section B as will maintain the optical centre or principal point of the photograph coincident, or practically coincident, with the foot of the optical axis may embody cam mechanism designed for effecting a lifting of the section A when a downward deflection is given to the optical axis and an upward lifting of the sliding part $b^1$ of the panel of the section B on an upward deflection of the said optical axis.

Or as is represented in the drawings a lever-like member may be employed acting to the same effect, the said member being constituted by a bar, denoted by the reference $h$, provided on its underside with a pair of parallel plate-like parts or cheeks $h^1$ having coincident holes therein to furnish bearings whereby the bar is fulcrumed on the spindle $g$, with the cheeks $h^1$ disposed between the brackets $f$ and the post $d^1$ in which the spindle $g$ has its bearing.

The said bar $h$ when so fulcrumed is located in and works through the longitudinal slot $c^8$ in the lower board $c^4$ of the base section and in the normal position of the parts lies horizontally in the slot with its front end disposed below the part $b^3$ of the sliding section $b^1$ of the panel which carries the lens, or lens system, and its rearward end below the part of the upper board $c^3$ adjoining the rear end of the slot therein.

It will be appreciated that if the lever-like member be rocked simultaneously with but at a somewhat greater speed of turning motion than the base section it will, when the base section is turned in the direction for giving angular depression to the optical axis, as when taking photographs from a height, operate to raise the section A relative to the section B by turning the upper board $c^3$ on the hinge $c^5$ as is illustrated by Figure 2 and that when the turning of the base section C is in the reverse direction for giving angular elevation to the optical axis, as for instance when photographing tall buildings from ground level, the said lever-like member will act to raise the sliding section $b^1$ relative to the section A as is illustrated by Figure 3, the section A in either case assuming the vertical plane.

For effecting the rocking or turning motions of the cradle-base section C and the associated lever-like bar member $h$, the brackets $f$ which carry the said base section on the spindle $g$ and the cheeks $h^1$ whereby the bar $h$ is fulcrumed on the spindle are given the formation of portions of toothed wheels the toothed peripheral parts being concentric with the axis of the said spindle, and the radius of the partial wheels on the brackets $f$ being somewhat greater than that of the partial wheels on the cheeks $h^1$ on the bar $h$, and these partial wheels are respectively engaged by spur wheels $f^1$, $f^1$ and $h^2$, $h^2$ on an operating shaft $i$ having a bearing in the post $d^1$ in which the spindle $g$ has its bearing, the said shaft $i$ being adapted for operation by a hand or foot actuated lever or being otherwise operated.

Although the bar $h$ is shown in the drawings as a straight flat bar its acting face or the ends thereof may be given such curved or inclined formation as may be found desirable, and it will be understood that the ratio of the gear wheels, or where cams are provided, the design or contour of the said cams, will be determined by mathematical calculation.

From the above description it will be appreciated that in photographic apparatus in accordance with my invention the body proper of the camera automatically assumes and maintains its vertical plane irrespective of the angle which any other parts of the apparatus may assume and furthermore it is on any variation of the angle of depression or elevation of the optical axis simultaneously and automatically so positioned relative to the lens, or lens system, as to maintain the centre or principal point of the photograph coincident, or practically so, with the foot of the optical axis.

Where the apparatus is designed for use on aeroplanes the cradle structure aforesaid will be mounted on a standard of robust construction such as is illustrated by Figure 5, the base being furnished with antivibration buffers denoted by the numeral 1.

In the said Figure 5 the vertical axis of the standard is shown laterally inclined as would be the case in the event of the rolling of the plane and the said figure illustrates the manner in which the body proper maintains its vertical position notwithstanding the inclinations assumed by the other parts.

Suitable mechanical means are provided for effecting the operation of the parts adapted for angular and rotational movements for the orientation of the camera or for adjusting its angle of depression or elevation, and graduated scales and pointers co-acting therewith are furnished on appropriate parts of the apparatus for indicating the degree of the angle of depression or elevation, or the extent of orientation from a head-on direction.

The camera body is furnished with a view finder, altimeter, shutter speed regulator and other accessories requisite or desirable on cameras, and the shutter which may be of the focal plane variable slit type may be controlled by a hand or foot operated lever or by electrical means, the said control means if desired being adapted when operated to effect the simultaneous operation of the locking pads aforesaid whereby undesirable movement of the camera from the position to which it has been orientated is prevented.

I wish it to be understood that I do not limit myself to the precise details of construction or formation of the parts described as the same may be varied without departing from my invention, and according to one modification in construction the hemispherical or dome-like parts may be replaced by annular cylindrical or polygonal ring-like members, the said ring-like members being so mounted on the rearwardly and forwardly disposed bars of the supporting cradle that they are respectively adapted to perform the relative motions aforesaid and their inner or presented ends being interconnected by a light excluding bellows-like tube reinforced with wiring adapted to maintain it from sagging while permitting it to perform such movements and expansion and contraction as necessary for permitting the relative movements of the rings interconnected thereby and associated respectively with the body proper and the lens or lens system.

Further, I wish it to be understood that although my invention has been particularly described and illustrated in its application to a stand supported camera it is equally applicable to cinematograph cameras, to hand cameras and to cameras adapted for a suspension mounting.

I claim:

1. Photographic apparatus, comprising a camera having a base tiltable in a direction to vary the angle of elevation of the optical axis of the camera, a body section mounted on the base to be elevated relatively thereto and having a holder for an image receiving surface, means for mounting said body section on the base for pivotal movement about a substantially horizontal axis transverse to the optical axis of the camera, means for automatically maintaining the body section in a substantially vertical plane irrespective of the angle to which the base is tilted in a direction to vary the angle of elevation of the optical axis of the camera, a lens section mounted on the base in cooperative relation with the body section and carrying a lens which is movable into elevated and depressed positions relatively to the base to thereby deflect the angle of elevation of the optical axis of the lens to any desired angle to the normal to the plane of an image receiving surface in the holder, and means responsive to said tilting movement of the base for automatically elevating the lens section or the body section relatively to the base to an extent proportional to the extent the base is tilted to raise or lower respectively the angle of elevation of the optical axis of the camera to maintain the foot of the optical axis of the lens and the center point of the image receiving surface substantially coincident.

2. Photographic apparatus according to claim 1, wherein said body section and holder for the image receiving surface are rotatable on an axis located forwardly of the focal plane of the camera.

3. Photographic apparatus according to claim 1, including a cradle-like structure by which said body and lens sections are mounted on the base, said structure comprising pairs of upwardly extending supporting arms mounted on the base and to which said sections are respectively attached, and wherein said transverse axis of said body section comprises pivots connecting said body section with the arms of one of said pairs, and said lens section has a vertically slidable connection with the other arms of said pairs.

4. Photographic apparatus according to claim 1, wherein said body section comprises a hollow dome-like part which is concentric with the transverse axis of said body section, and said lens section comprises a complemental dome-like part coaxial with the lens and spaced longitudinally from said dome-like part on said body section, and including a flexible light-excluding connection between said dome-like parts.

5. Photographic apparatus according to claim 1, wherein said holder for the image receiving surface is swivelled on said body section to rotate freely about an axis at a right angle to the transverse axis of said body section, and said means for maintaining said body section in a substantially vertical plane also maintains said holder in an upright position irrespective of lateral inclination of the camera.

6. Photographic apparatus, comprising a camera, a base therefor including a pair of superposed supporting members pivotally connected on a substantially horizontal axis for angular movement of the upper member relatively to the lower member, a body section pivotally mounted on the upper member for swinging movement about an axis parallel with the pivotal connection between said members and carrying a holder for an image receiving surface, a lens section mounted on the base and including a lens carrying slide movable into elevated and depressed positions relatively to the base, and means operative by said relative angular movement between said members for automatically coordinating the position of the lens slide with the body section to maintain the optical axis of the lens and the center of the image receiving surface substantially coincident.

7. Photographic apparatus according to claim 6, including means for supporting said members for tilting movement as a unit about a substantially horizontal axis transverse to the optical axis of the camera, and means operative by such tilting movement of said members as a unit for effecting said relative angular movement between said members.

8. Photographic apparatus, comprising a camera embodying a body section and a lens section and a light-excluding connection between said sections, a base supporting said sections including a pair of superposed members having means pivotally connecting them on a substantially horizontal axis transverse to the optical axis of the camera for swinging movement of the upper member into different angular relations with the lower member, means on said upper member for pivotally supporting said body section on a substantially horizontal axis transverse to the optical axis of the camera, a holder for positioning an image receiving surface mounted on said body section, means for maintaining said body section in a substantially vertical position while the base is tilted in either direction in the vertical plane of the optical axis of the camera, a lens carrying slide movable substantially vertically on said lens section, and means operative by relative angular movement of said members about their said pivotal connection for automatically elevating or depressing said lens slide and thereby maintain the optical axis of the lens substantially coincident with the center point on the image receiving surface positioned by said holder.

9. Photographic apparatus according to claim 8, including a mount on which said base members are supported for tilting movement as a unit about a substantially horizontal axis transverse to the optical axis of the camera, and means interposed between said mount and said members for automatically effecting said relative angular movement of said members when the latter are tilted as a unit relatively to the mount.

10. Photographic apparatus, comprising a camera having a holder for an image receiving surface and a lens for projecting an image thereon, a tiltable base supporting said holder and lens for relative movement in a direction to control the height of the image on said surface, means for maintaining said holder automatically in a vertical plane irrespective of the angle which any other part of the apparatus may assume, and means responsive to tilting movement of the base and interconnecting said holder and lens for relatively adjusting them automatically in said direction and to an extent to maintain the foot of the optical axis and the center point of the image on said surface substantially coincident when the base is tilted to set the optical axis of the camera at any desired angle to the normal to the plane of the image receiving surface.

11. Photographic apparatus, comprising a camera having a holder for an image receiving surface and a lens for projecting an image thereon, a base supporting the holder and lens for raising and lowering movements and mounted to tilt to vary the angle of elevation of the optical axis of the camera, means for maintaining said holder automatically in a vertical plane irrespective of the angle to which the base may be tilted, and means responsive to tilting movement of the base and interconnecting said holder and lens for relatively raising and lowering them automatically and in a ratio to maintain the foot of the optical axis and the center point of the image on said surface substantially coincident when the base is tilted to set the optical axis of the camera at any desired angle to the normal to the plane of the image receiving surface.

BERNARD WHEELWRIGHT.